K. O. LEON.
ANTIFRICTION BALL OR ROLLER BEARING.
APPLICATION FILED NOV. 3, 1919.
1,423,950.
Patented July 25, 1922.
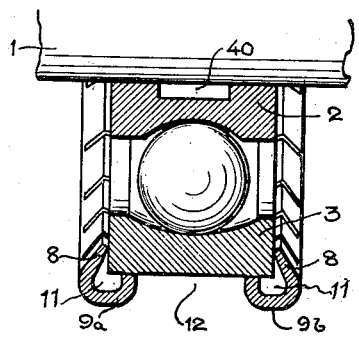
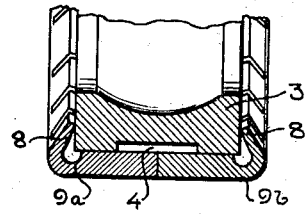
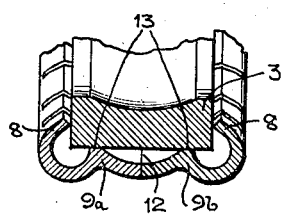
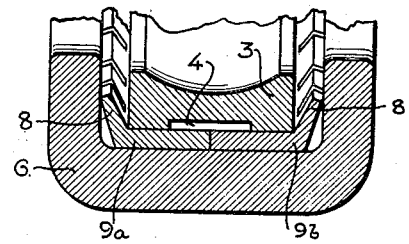
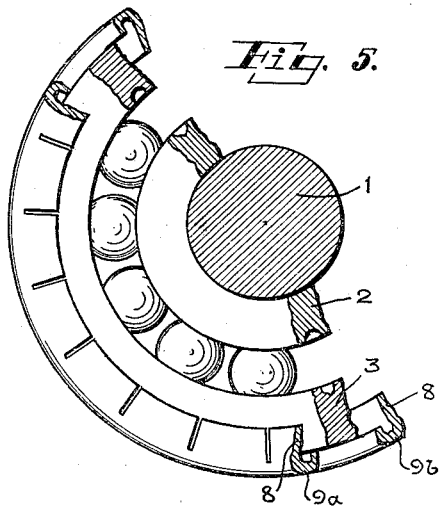
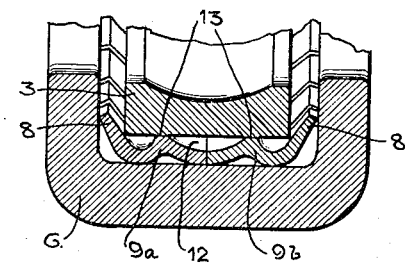
Inventor
K. O. Leon,
By H. R. Kerslake.
Atty.

UNITED STATES PATENT OFFICE.

KARL OSKAR LEON, OF STOCKHOLM, SWEDEN, ASSIGNOR TO NORDISKA KULLAGER AKTIEBOLAGET, OF GOTTENBORG, SWEDEN.

ANTIFRICTION BALL OR ROLLER BEARING.

1,423,950.   Specification of Letters Patent.   Patented July 25, 1922.

Application filed November 3, 1919. Serial No. 335,460.

*To all whom it may concern:*

Be it known that I, KARL OSKAR LEON, citizen of Sweden, residing at Stockholm, in the county of Stockholms län Sweden, have invented certain new and useful Improvements in Antifriction Ball or Roller Bearings (for which I have filed an application in Sweden Oct. 28, 1918), of which the following is a specification.

This invention relates to improvements in anti-friction bearings and has for its object to provide means for obtaining a bearing, which can be exposed to large sudden increases in load without injury.

The invention consists in means formed in or associated with the race rings to permit radial expansion of the rings or axial movement of the outer race ring.

In the accompanying drawing, which forms part of this specification, the Figures 1 to 4 and 6 illustrate different embodiments of the invention and are all sectional views of the lower halves of anti-friction ball or roller bearings or parts of such bearings.

Fig. 5 is a fragmentary side view partly in section of one form of the improved bearing.

In the drawing, 1 designates a shaft, 2 an inner race ring, 3 an outer race ring, 4 a groove in the outer race ring 3, 40 a groove in the inner race ring 2, $9^a$ and $9^b$ rings of different shape and material applied outside the outer race ring, 6 a housing or casing for the bearing, and 8 annular flanges on the rings $9^a$ respectively.

In Figure 1 the inner face ring 2 is provided on its central surface with a groove 40. The reinforcing ring around the outer race ring 3 being made in the two parts $9^a$ and $9^b$, leaving a space 12 between them, and also provided with flanges 8 formed in such way, that a hollow space 11 is left on the side facing the race ring 3, and with the inner edges of the flanges 8 contacting with said race ring 3, so that a yielding effect is attained in axial directions. The flanges 8 are provided with radial slots as shown, thus increasing the yielding properties of the bearing.

In Figure 2, the two reinforcing rings $9^a$ and $9^b$ are not separated by an interspace, but the race ring 3 is for the purpose of flexibility provided on its outer surface with a groove 4.

In the embodiment shown in Figure 3, the flanges 8 do not have their inner edges directed toward the race ring 3 as in the construction shown in Fig. 1, but the inner edges of the flanges engage the radial inner surfaces of the housing 6, thus providing the same yielding effect in axial direction as achieved by means of the arrangement shown in Figs. 1 and 2.

In Figure 4, the section of the reinforcing rings $9^a$ and $9^b$ has a wave shape leaving a hollow space 12 between the cylindrical outer surface of the race ring and the reinforcing ring and forming supporting surfaces 13 for said race ring, thereby imparting to the reinforcing rings resilient properties.

In the construction shown in Figure 6, the rings $9^a$ and $9^b$ are of wave shape similar to the rings shown in Figure 4, but in this embodiment the flanges 8 are directed outwardly to engage the radial inner surfaces of the casing 6, similar to the construction shown in Figure 3.

The embodiments illustrated, disclose some form of the practical embodiment of the invention, but it is apparent that these forms may be varied without departing from the spirit of the invention as expressed in the following claims.

What I claim and desire to secure by Letters-Patent is:—

1. The combination with antifriction ball or roller bearing, of means for rendering said bearing resilient including a surrounding supporting ring provided with inwardly directed yielding flanges, said flanges sloping relatively to the side surfaces of the race ring so as to form hollow spaces between the flanges and the adjacent surfaces of the outer race ring.

2. A combination of the kind defined by claim 1 having a casing surrounding said supporting ring and provided with side walls, the edges of said flanges contacting with the inner surfaces of said walls.

3. A combination of the kind defined by claim 1 in which the flanges are provided with radial slots.

4. A combination of the kind defined by claim 1 in which the supporting ring has a wave-shaped cross-section, and portions of said supporting ring engaging the periphery of the outer race ring at spaced points.

In testimony whereof I have affixed my signature.

KARL OSKAR LEON.